US005405300A

United States Patent [19]

Sakita

[11] Patent Number: 5,405,300

[45] Date of Patent: Apr. 11, 1995

[54] MECHANISM FOR INTERMITTENT ROTATION OF FIRST AND SECOND SHAFTS AND CONTINUOUS ROTATION OF A THIRD SHAFT

[76] Inventor: Masami Sakita, 1259 El Camino Real #121, Menlo Park, Calif. 94025

[21] Appl. No.: 300,560

[22] Filed: Sep. 6, 1994

Related U.S. Application Data

[62] Division of Ser. No. 147,578, Nov. 5, 1993.

[51] Int. Cl.6 .......... F16H 55/17

[52] U.S. Cl. .......... 475/225; 74/437

[58] Field of Search .......... 74/63, 84 R, 437; 123/245; 418/35, 36; 475/225

[56] References Cited

U.S. PATENT DOCUMENTS

| | | | |
|---|---|---|---|
| 88,215 | 3/1869 | Ruggles | 418/36 |
| 1,224,642 | 5/1917 | Holmes | 418/35 |
| 2,253,270 | 8/1941 | Golber | 74/437 |
| 2,657,676 | 11/1953 | Mallinckrodt | 418/35 |
| 3,294,071 | 12/1966 | Turco | 418/35 |
| 3,730,654 | 5/1973 | McMahon | 418/36 |
| 4,028,019 | 6/1977 | Wildhaber | 418/36 |

FOREIGN PATENT DOCUMENTS

| | | | |
|---|---|---|---|
| 557751 | 5/1923 | France | 418/36 |
| 589192 | 1/1978 | U.S.S.R. | 74/437 |

*Primary Examiner*—Michael Koczo

*Attorney, Agent, or Firm*—Victor R. Beckman

[57] ABSTRACT

A rotary piston engine (20) is shown which includes a housing (22) having a cylindrical working chamber with inlet (56) and exhaust (54) ports. First and second piston assemblies (30 and 32) each of which includes at least one pair of diametrically opposed pistons (30A and 30B, and 32A and 32B) are located in the working chamber. Backstopping clutches (44 and 46) limit rotation of the piston assemblies (30 and 32) to one direction (42). Piston assemblies (30 and 32) are connected to the engine output shaft through a differential (78) and non-circular gear sets (74 and 76), each of which gear sets includes a tear-drop shaped gear (74A and 76A) and heart shaped gear (74B and 76B). When the cusp of the tear-drop shaped gear engages the recess in the heart shaped gear, the tear-drop shaped gear is prevented from rotating. The piston assemblies rotate intermittently whereby pistons of the stopped assembly are trailing pistons during portions of the power and intake phases of engine operation. In one embodiment, the tear-drop shaped gear include teeth in the form of rollers (132).

5 Claims, 11 Drawing Sheets

| SUB-CHAMBER | 1 | 2 | 3 | 4 | 5 |
|---|---|---|---|---|---|
| A | START OF EXHAUST | EXHAUST | EXHAUST | EXHAUST | END OF EXHAUST |
| B | IGNITION (POWER) | EXPANSION (POWER) | EXPANSION (POWER) | EXPANSION (POWER) | END OF EXPANSION |
| C | START OF COMPRESSION | COMPRESSION | COMPRESSION | COMPRESSION | END OF COMPRESSION |
| D | START OF INTAKE | INTAKE | INTAKE | INTAKE | END OF INTAKE |
| TIME | $t_4$ | $t_5$ | $t_6$ | $t_7$ | $t_8$ |

MECHANISM FOR INTERMITTENT ROTATION OF FIRST AND SECOND SHAFTS AND CONTINUOUS ROTATION OF A THIRD SHAFT

RELATED APPLICATION

This is a divisional application of Copending application Ser. No. 08/147,578, filed Nov. 5, 1993, by Masami Sakita entitled Rotary Piston Engine.

FIELD OF THE INVENTION

This invention relates generally to a mechanism for interconnecting first, second and third shafts for intermittent rotation of said first and second shafts and continuous rotation of said third shaft. The mechanism is well adapted for use with rotary piston engines for providing the engine piston assemblies with intermittent rotation while the engine output shaft is continuously rotated.

BACKGROUND OF THE INVENTION

Mechanisms for providing piston assemblies of rotary piston engines with intermittent rotation are known as shown, for example, in U.S. Pat. No. 1,224,642—R. B. Holmes; 2,657,676—G. E. Mallincrodt; and 3,294,071—Turco. Such mechanisms are, however, generally relatively complicated in design and include braking systems, or the like, to intermittently stop rotation of the rotary piston assemblies.

SUMMARY OF THE INVENTION

An object of this invention is the provision of improved mechanism for interconnecting first, second and third shafts for intermittent rotation of said first and second shafts and continuous rotation of said third shaft.

The present invention includes differential means having first and second input shafts and an output, together with first and second non-circular gear sets. Each of the first and second gear sets includes intermeshing generally tear-drop and heart shaped gears. The generally tear-drop shaped gears are formed with a cusp, and the generally heart shaped gears are formed with a recess engageable by the cusp of the associated tear-drop shaped gear during rotation of the gear sets. The differential output is connected through a third gear set, such as a circular gear set, to an output shaft. The heart shaped gears are affixed to the output shaft, the axis of rotation of which shaft extends through the recess formed in the heart shaped gears. Whenever the cusp of the tear-drop shaped gear engages the recess in the associated heart shaped gear, the tear-drop shaped gear is prevented from rotating. The tear-drop shaped gears of the first and second gear sets are connected to the first and second differential input shafts, respectively.

BRIEF DESCRIPTION OF THE DRAWINGS

The above and other objects and advantages of the invention will be better understood from the following description when considered with the accompanying drawings. It here will be understood that the drawings are for purposes of illustration only and not by way of limitation of the invention. In the drawings, wherein like reference characters refer to the same parts in the several views.

DETAILED DESCRIPTION

Figure 1:
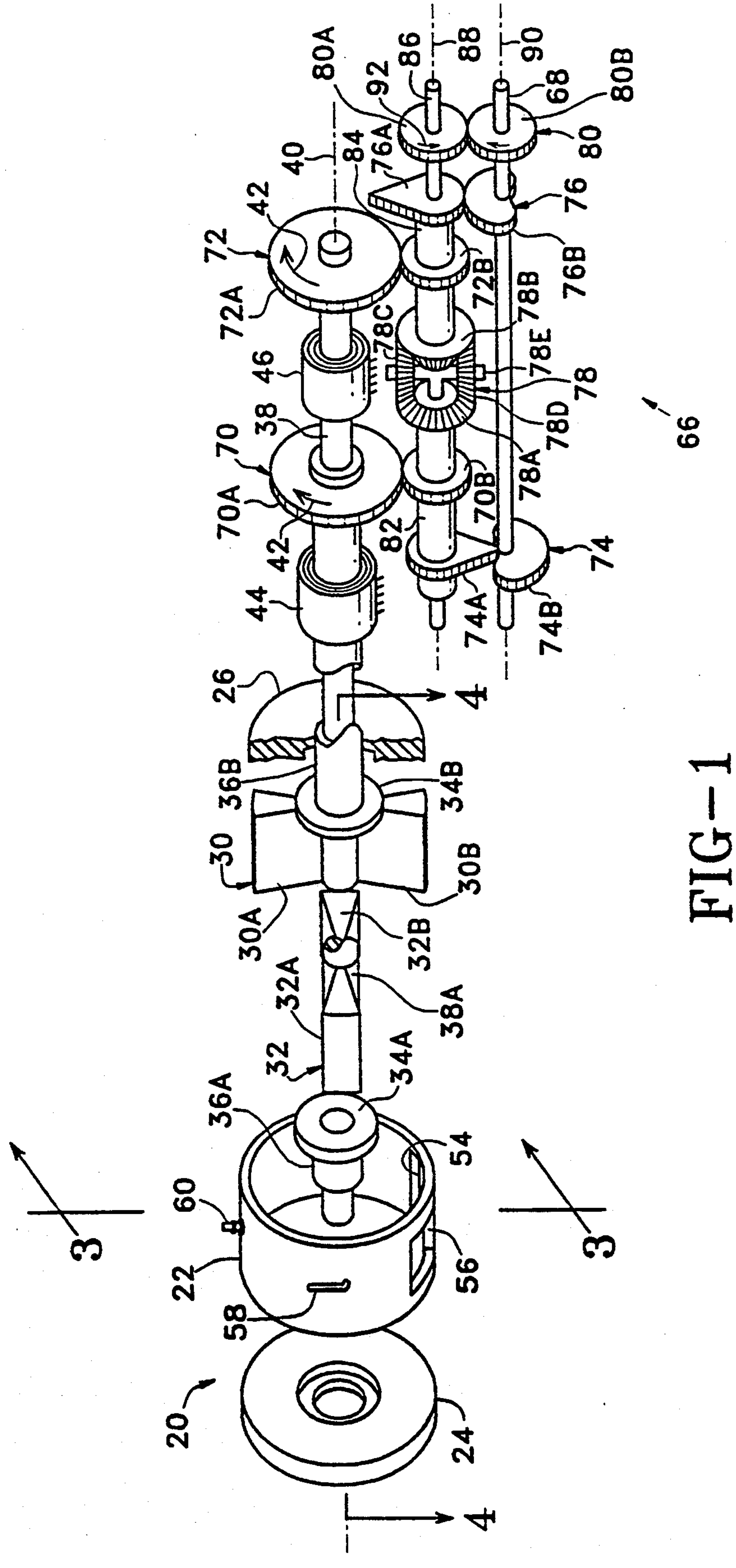
FIG. 1 is an exploded isometric view, partly in section, of a rotary piston engine embodying the novel mechanism of this invention.
Figure 2:
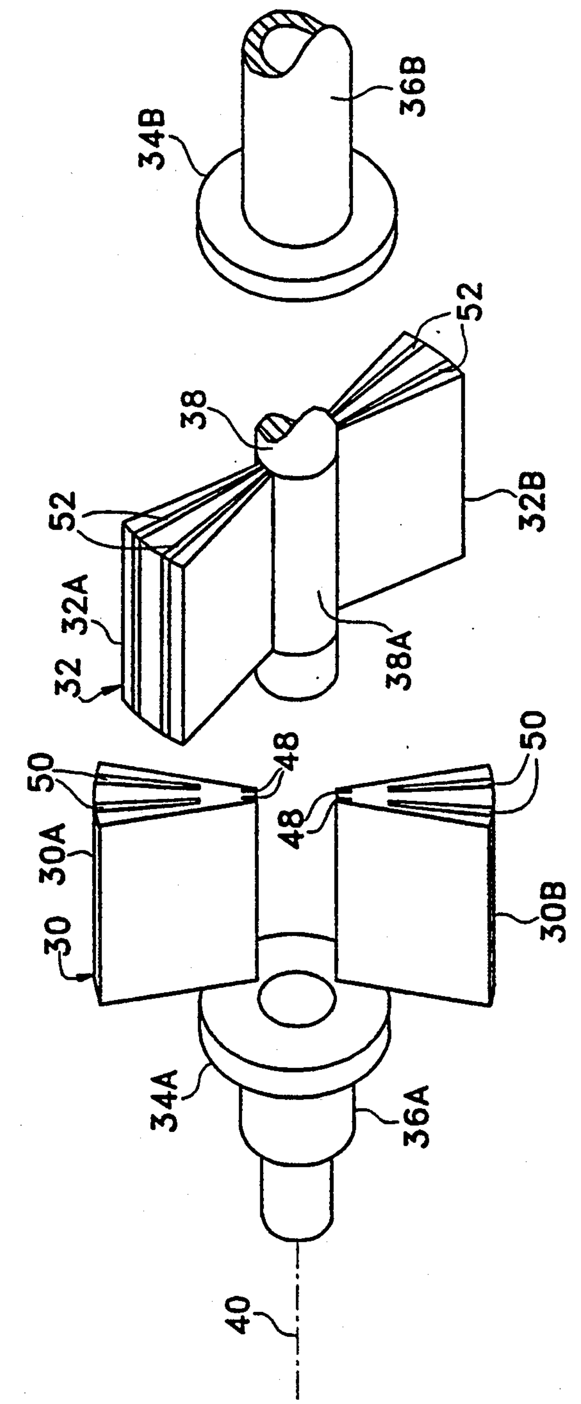
FIG. 2 is an enlarged exploded isometric view, partly in section, of the first and second piston assemblies included in the engine.
Figure 3:
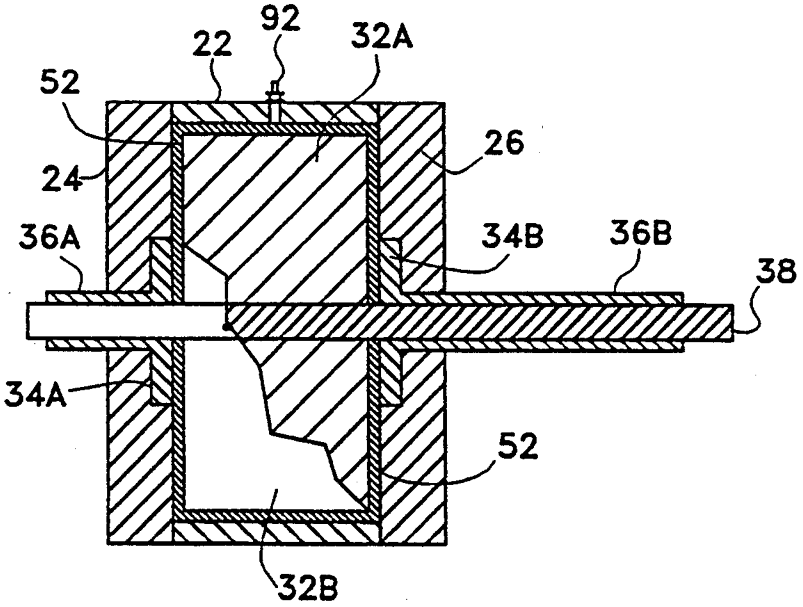
FIG. 3, is a cross-sectional view taken substantially along line 3—3 of FIG. 1.
Figure 4:
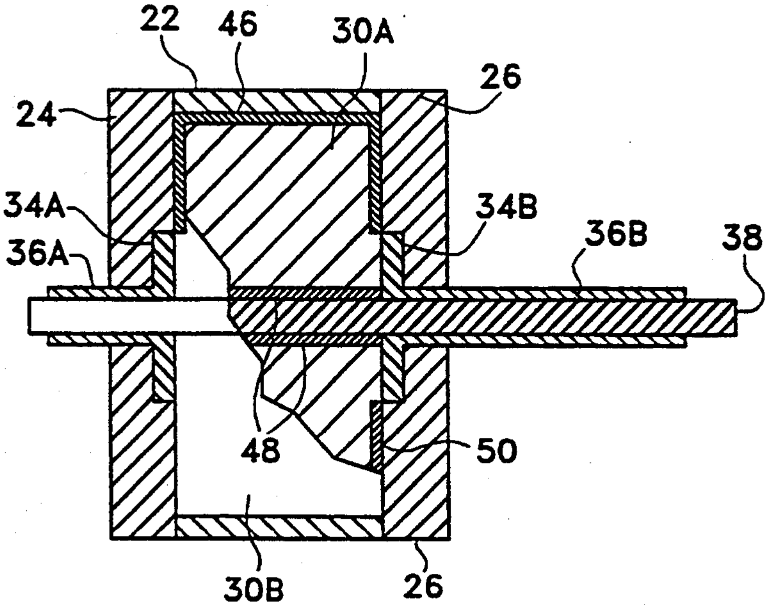
FIG. 4 is a cross-sectional view taken substantially along line 4—4 of FIG. 1.

Reference now is made to FIG. 1 of the drawings wherein an engine 20 is shown to include a stationary housing 22 having a cylindrical bore which is closed at opposite ends by end plates 24 and 26 attached thereto as by bolts or other suitable means, not shown, to form a cylindrical working chamber. In the engine shown in FIG. 1, the working chamber is divided into first and second pairs of diametrically opposite sub-chambers by pistons included in first and second piston assemblies 30 and 32. As also seen in FIG. 2, piston assembly 30 includes a pair of diametrically opposed pistons 30A and 30B, and piston assembly 32 includes a pair of diametrically opposed pistons 32A and 32B. The engine cylinder and pistons are also shown in FIGS. 3 and 4 of the drawings.

Pistons 30A and 30B are affixed to hubs 34A and 34B at facing ends of tubular piston shaft sections 36A and 36B, respectively. Shaft sections 36A and 36B together with associated hubs 34A and 34B, are supported for rotation about the axis of the cylindrical bore in housing 2 by end plates 24 and 26, respectively, through suitable bearing means, not shown. Hubs 34A and 34B are located in recesses formed at the inner walls of the end plates. An inner piston shaft 38 is rotatably mounted in the tubular shaft sections 36A and 36B and extends therebetween. Pistons 32A and 32B of second piston assembly 32 are attached to inner piston shaft 38 at diametrically opposite positions. Shaft 38 may be formed in interengageable sections, including section 38A to which pistons 32A and 32B are attached, to facilitate assembly, which shaft sections rotate as a unit when in the illustrated engaged condition. Piston assemblies 30 and 32 are rotatable about a common axis 40 and, in operation, rotate in the same direction as indicated by arrows 42. Backstopping, one-way, clutch means 44 and 46 on tubular shaft section 36B and inner piston shaft 38, respectively, prevent rotation of the piston assemblies in the direction opposite arrow 42. Any suitable one-way clutches, such as sprag-type clutches, may be employed to prevent such backward rotation.

The working chamber is divided into two pairs of diametrically opposite sub-chambers by the four wedge-shaped pistons 30A, 30B, 32A and 32B. As will become apparent, each piston assembly alternately rotates and stops such that trailing pistons are stationary during at least a portion of the power and intake phases of engine operation, and periodically variable volume sub-chambers are provided between adjacent pistons. Sealing of sub-chambers to prevent the flow of gases therebetween is provided by any suitable means including for example, straight seal means 48 along the inner concave surfaces of pistons 30A and 30B which engage inner piston shaft section 38A. Generally U-shaped seal means 50 extend along the outer convex surfaces of pistons 30A and 30B, and along opposite ends thereof, for sealing engagement between the pistons and cylinder walls. Similarly, generally U-shaped seal means 52 extend along the outer convex surfaces of pistons 32A and 32B, and along opposite ends thereof, for sealing engagement between these pistons and cylinder walls.

As seen in FIG. 1, engine housing 22 is provided with an exhaust port 54 followed, in the direction of piston travel, by an intake port 56. Next, in the direction of piston travel, a fuel injection nozzle 58 is provided which is connected to a source of fuel, through which nozzle fuel is injected into the sub-chambers following intake of air through inlet port 56. Finally, ignition device 60, such as a spark plug, is provided for ignition of the compressed air/fuel mixture contained in the sub-chamber.

Figure 5:
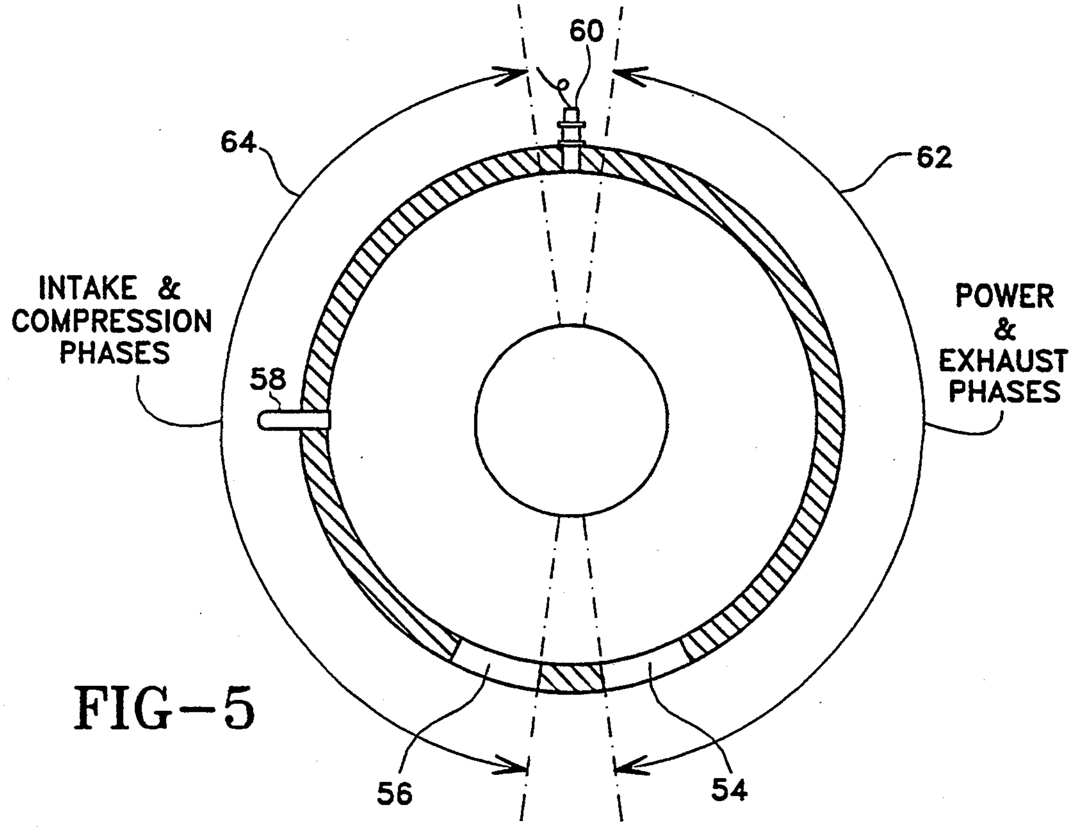
FIG. 5 is a schematic illustration showing separation of functions within the engine chamber.

With the illustrated four-piston engine, the operating chamber is divided in four sub-chambers. Referring to FIG. 5, power and exhaust phases of engine operation occur during angular piston movement identified by double-headed arrow 62, and intake and compression phases occur during angular piston movement identified by double-headed arrow 64. It will be seen that all engine operating phases occur over angular piston movements of somewhat less than 180 degrees. That is, substantially one-half of the engine working chamber is used solely for intake and compression functions, and substantially the other one-half is used solely for power and exhaust functions.

The engine as described thus far may be of substantially the same design as shown in U.S. Pat. No. 5,133,317 by the present inventor, the entire contents of which patent specifically are incorporated by reference herein. Novel connecting means, identified generally by reference numeral 66, for operatively connecting the first and second piston assemblies 30 and 32 to an engine output shaft 68 and providing the piston assemblies with intermittent rotation, now will be described with reference to FIGS. 1 and 6 of the drawings.

Figure 6:
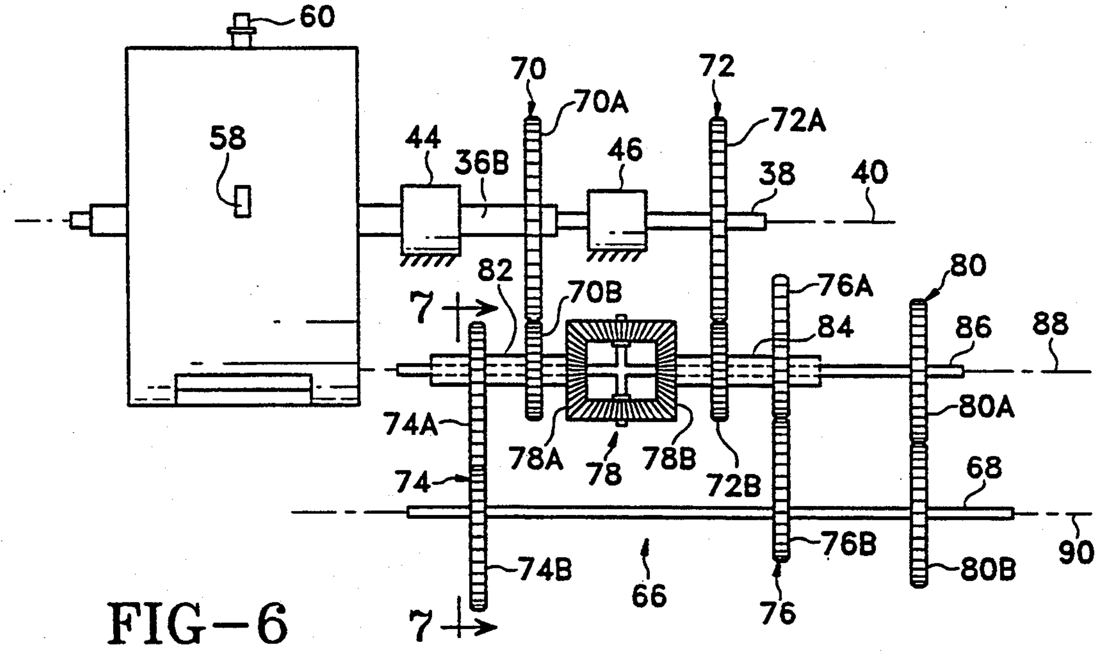
FIG. 6 is a simplified side elevational view of the rotary piston engine shown in FIG. 1.

In the embodiment of the invention illustrated in FIGS. 1 and 6, connecting means 66 includes two pairs of circular gear sets 70 and 72, two pairs of non-circular gear sets 74 and 76, differential means 78, and gear set 80 which, for purposes of illustration, comprises a circular gear set. As will become apparent, gear set 80 may comprise a pair of non-circular gears, such as elliptical gears, if desired. Suffixes A and B are used to identify separate gears of the gear pairs. Gear 70A of gear set 70 is connected to piston assembly 30 through outer piston shaft 36B, and gear 72A of gear set 72 is connected to the other piston assembly 32 through inner piston shaft 38. For the illustrated 4-piston engine, circular gear pairs 70 and 72 are provided with a 1:2 gear ratio whereby gears 70B and 72B undergo two complete revolutions for each complete revolution of piston shafts 36B and 38, respectively.

Circular gears 70B and 72B are affixed to tubular shafts 82 and 84, respectively, which are rotatably mounted on spider shaft 86 of differential 78. Spider shaft 86, which for purposes of description also is defined as the differential output, is supported by suitable bearings, not shown, for rotation about axis 88 which extends parallel to piston shaft axis 40. Engine output shaft 68 also is supported by suitable bearings, not shown, for rotation about axis 90 which extends parallel to piston shaft axis 40 and spider shaft axis 88. Affixed to tubular shaft 82 are teardrop shaped gear 74A of non-circular gear set 74 and end gear 78A of differential 78 for simultaneous rotation thereof with gear 70B. Similarly, tubular shaft 84 has affixed thereto teardrop shaped gear 76A of non-circular gear set 76 and end gear 78B of differential 78 for simultaneous rotation thereof with gear 72B. For purposes of description, shafts 82 and 84 to which differential end gears 78A and 78B are affixed, are defined as differential inputs.

Differential 78 may be of any conventional type such as the illustrated bevel gear differential which, in addition to end, or sun, gears 78A and 78B, includes spider, or planet, gears 78C and 78D rotatably mounted on spider cross shaft 78E. Spider gears 78C and 78D mesh with end gears 78A and 78B. The relationship between rotation of sun gears 78A and 78B, or differential inputs, and spider shaft 86, or differential output, of differential 78 is $$z=(x+y)/2 \tag{1}$$

where:

z is rotational rate of spider shaft 86,
x is rotational rate of sun gear 78A, and
y is rotational rate of sun gear 78B.

During engine operation, sun gears 78A and 78B are intermittently prevented from rotation. From Equation (1), it will be seen that when one of the sun gears is stationary, spider shaft 86 rotates at twice the rate of the rotating sun gear. When both sun gears rotate at the same speed, spider shaft also rotates at that speed, with no relative motion between the sun gears and spider shaft. Backstopping one-way clutches 44 and 46 limit rotation of the sun gears 78A and 78B and teardrop shaped gears 74A and 76A to one direction shown by arrows 42 seen in FIG. 1.

Figure 7:
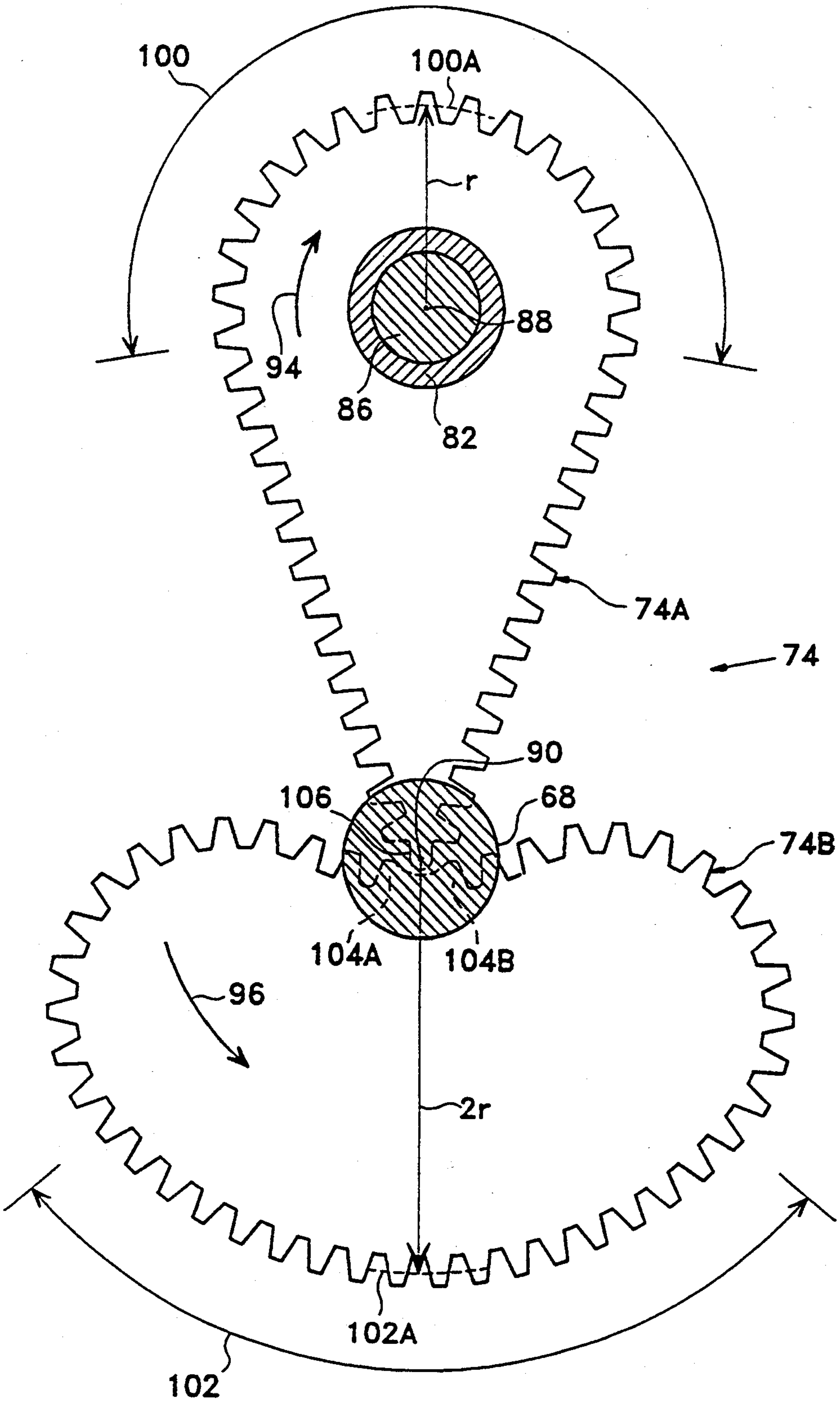
FIG. 7 is an enlarged sectional view taken along line 7—7 of FIG. 6.

Reference now is made to FIG. 7 wherein novel non-circular gear set 74 is shown in detail. Non-circular gear sets 74 and 76 are of the same design so that a detailed description of only one is required. In FIG. 7 gear set 74 is shown in the position illustrated in FIGS. 1 and 6, which is 180 degrees out of phase with gear set 76. As will become apparent hereinbelow, the degree to which gear sets 74 and 76 are rotationally out of phase varies continuously during engine operation. As viewed in FIG. 7 gears 74A and 74B rotate in the direction of arrows 94 and 96, respectively.

For purposes of illustration, the tear-drop shaped gear 74A is shown comprising a tear-drop shaped body formed with outwardly extending gear teeth about the periphery thereof. Heart shaped gear 74B is shown comprising a heart shaped body formed with outwardly extending gear teeth for engagement with gear teeth of the tear-drop shaped gear. Each gear is provided with the same number of teeth whereby the same teeth interengage during operation of the gears.

Gears 74A and 74B are formed with circular arc sections identified by double headed arrows 100 and 102 having radii of r and 2r, respectively, to the gear pitch lines, portions of which pitch lines 100A and 102A are shown in broken lines in the drawing. With the 1 to 2 velocity, or gear, ratio of the circular arc sections, it will be apparent that circular arc section of gear 74A is twice that of the circular arc section of gear 74B. For example only, circular arc sections 100 and 102 may extend for 200° and 100° respectively At opposite ends of the circular arc section 102, heart shaped gear 74B is formed with generally spiral-shaped mirror image sections that form a recess where the spiral-shaped sections intersect. The axis of rotation, 90, of the heart shaped gear extends along said recess outside the body of the gear between a pair of adjacent gear teeth 104A and 104B. In the illustrated arrangement, shaft 68 is formed in sections, the ends of which sections are affixed to the heart shaped gears thereby providing access for engagement of teeth at the recess with teeth on the tear-drop shaped gear. The cusp, or pointed end, of tear-drop shaped gear 74A is provided with a tooth 106 which is adapted for engagement with the teeth 104A and 104B on the heart shaped gear as seen in FIG. 7. When tooth 106 is positioned between adjacent teeth 104A and 104B, it will be seen that heart shaped gear 74B is rotatable about axis 90 while tear-drop shaped gear 74A is prevented from rotating about axis 88. It here will be noted that instead of forming shaft 68 in sections attached to the heart shaped gears, the shaft may be provided with off-set sections at the gears, or may be formed with notches, or depressions at the gears to accommodate the gear teeth thereat.

Operation of the engine employing the novel gear mechanism of this invention will best be understood with reference also to FIGS. 8A–8D and 9. Reference first is made to FIGS. 8A–8D wherein sequential operating positions of the engine pistons and non-circular gear sets 74 and 76 are schematically illustrated, and functions at the four engine sub-chambers are identified in chart form. Sub-chambers between adjacent pistons are identified by the letters A, B, C, and D. In the engine schematics the spark plug is located adjacent the top of the engine housing, and the spark plug, outlet and inlet ports, and fuel injection nozzle are located in the same relative positions as illustrated in FIG. 1. In the illustrated engine operation, fuel is injected during the compression phase. Alternatively, fuel may be injected at the end of the compression phase at the point labeled "ignition". Furthermore, a fuel/air mixture may be supplied to the engine through the inlet port, in which case no fuel injection means are required. Regardless of how and when fuel is introduced into the sub-chambers, or how it is ignited, FIGS. 8A through 8D illustrate engine operation wherein the trailing pistons are prevented from rotating during at least a portion of the expansion and intake phases for improved engine operating efficiency.

The piston assemblies and non-circular gear sets are shown at five different positions in each of drawings 8A through 8D, which positions are labeled 1 through 5. Together, drawing FIGS. 8A through 8D show angular positions of the piston assemblies and non-circular gear sets 74 and 76 which occur during one complete revolution of the piston assemblies. Since the non-circular gear sets are connected to the piston assemblies through circular gear pairs 70 and 72 having a 1:2 gear ratio, the non-circular gears complete two revolutions for each revolution of the piston assemblies. Output shaft 68 also completes two revolutions for each revolution of the piston assemblies.

Figure 8A:
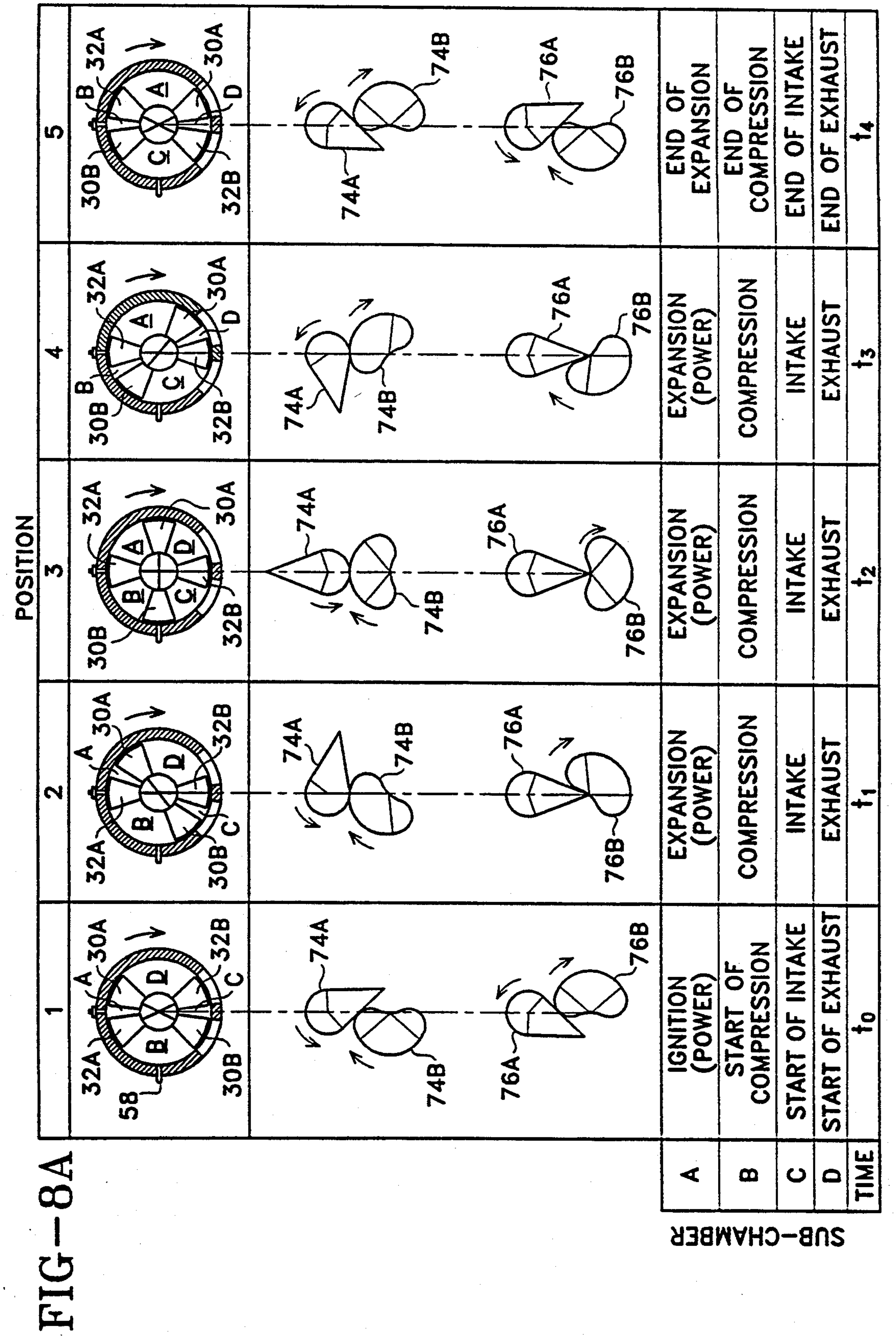
FIGS. 8A through 8D schematically illustrate a sequence of operational positions of the engine.

At position 1 of FIG. 8A, ignition takes place in sub-chamber A between pistons 30A and 32A when sub-chamber A is substantially at its smallest volume, compression starts in sub-chamber B, air starts to be drawn into sub-chamber C through inlet port 56, and the exhaust of spent gases through exhaust port 54 begins at sub-chamber D. The power, compression, intake and exhaust phases occurring at the respective sub-chambers A, B, C and D continue from position 1 through position 5 of the piston assemblies shown in FIG. 8A. Fuel is injected into sub-chamber B at some point in piston travel during which fuel injection nozzle 58 communicates with sub-chamber B. As noted above, other means for supplying the engine with fuel are contemplated.

At position 1 of FIG. 8A, the instantaneous velocity, or gear, ratio for both gear sets 74 and 76 is 1 and gears of both sets are rotating at the same rate. In FIG. 9, to which reference now is also made, a graph showing rotational speeds of gears 74A, 76A and interconnected gears 74B and 76B versus time is shown, for an engine operating at a constant output speed, S/2. In FIG. 9, the rotational rate of tear-drop shaped gears 74A and 76A is identified by reference characters 74A-S and 76A-S, respectively, and the rotational rate of heart shaped gears 74B and 76B affixed to engine output shaft 68 is identified by reference character 68-S. As seen in FIG. 9, at time $t_0$, the tear-drop and heart shaped gears are shown rotating at speed S/2. In FIGS. 8A–8D, times $t_0$–$t_{16}$ are shown which correspond to times $t_0$–$t_{16}$ in FIG. 9.

During travel from position 1 to position 2 of FIG. 8A, the velocity ratio of gear set 74 increases from 1 to 2, while the velocity ratio of gear set 76 decreases from 1 to 0. At time $t_1$, gear set 74 is shown rotated to a position where circular arc sections of gears 74A and 74B are initially engaged to provide for the velocity ratio of 2. At the same time, gear set 76 is shown rotated to a position where the cusp of tear-drop shaped gear 76A initially engages the recess in heart shaped gear 76B thereby stopping rotation of tear-drop shaped gear 76A. Rotation of tear-drop shaped gears 74A and 76A at speed S and at zero speed, respectively, at time $t_1$ is shown in FIG. 9. These rotational speeds are maintained from time $t_1$ through time $t_3$, during travel from position 2 to position 4 of FIG. 8A. As seen in FIG. 8A, trailing piston 32A of expansion sub-chamber A, and trailing piston 32B of intake sub-chamber C are stationary during the time period between $t_1$ and $t_3$. By stopping trailing piston 32A during at least a portion of the expansion phase, engine efficiency is improved over prior art rotary piston engines wherein the trailing piston continues to move throughout the expansion phase. In addition, it will be noted that connection of leading piston 32B to the engine output shaft 68 during a portion of the engine expansion phase from time $t_1$ to time $t_3$ is through gear set 74 during which time these gears have a velocity ratio of 2. As noted above, during other portions of the expansion phase, between times $t_0$ and $t_1$ and between times $t_3$ and $t_4$, the velocity ratio of gear set 74 is less than 2. As seen in FIG. 9, the rotational speed 74A-S of tear-drop shaped gear 74A decreases from S to S/2 between times $t_3$ and $t_4$. Simultaneously, the rotational speed 76A-S of tear-drop shaped gear 76A increases from zero to S/2 between times $t_3$ and $t_4$.

Figure 8B:
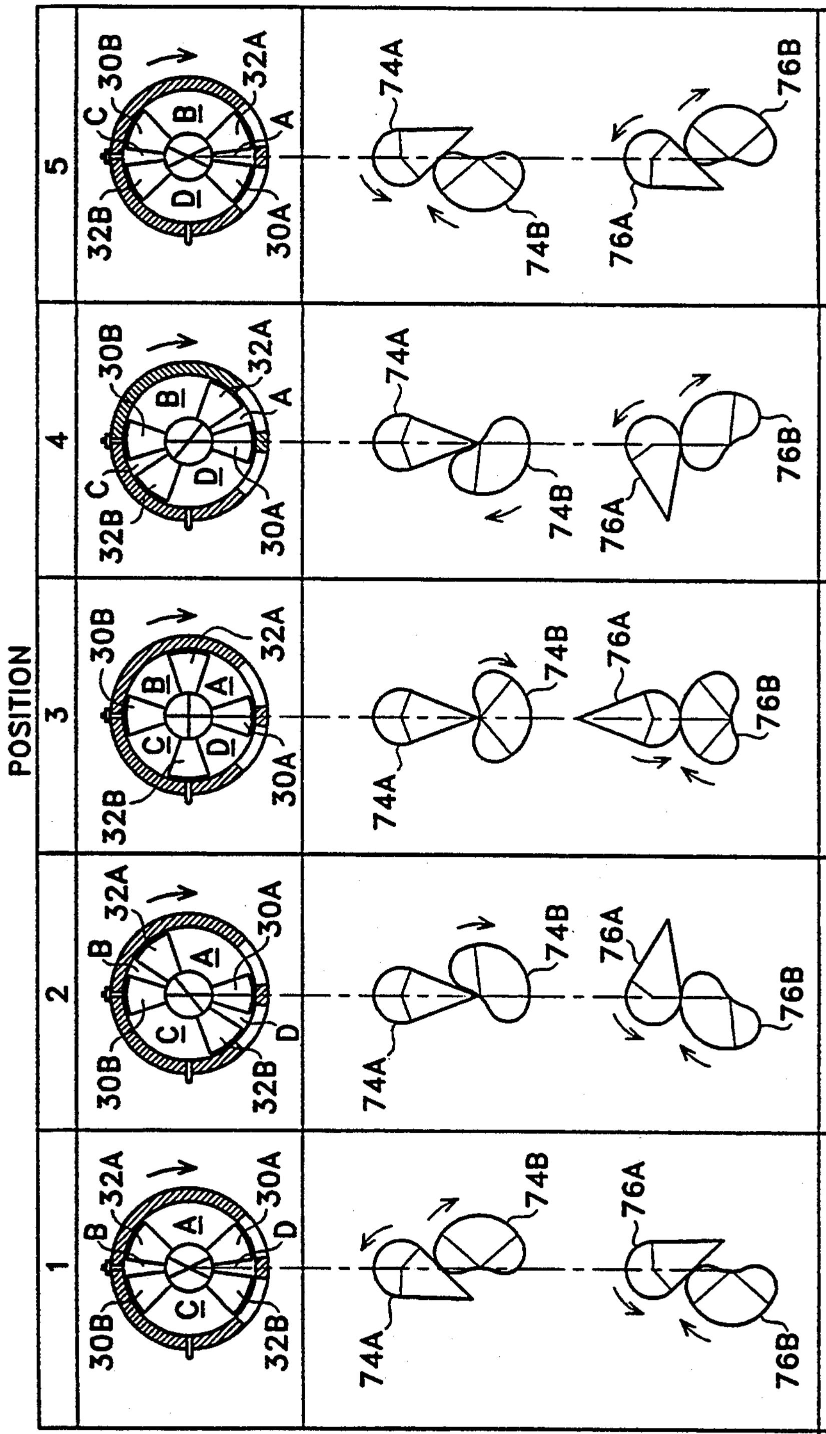
Figure 8C:
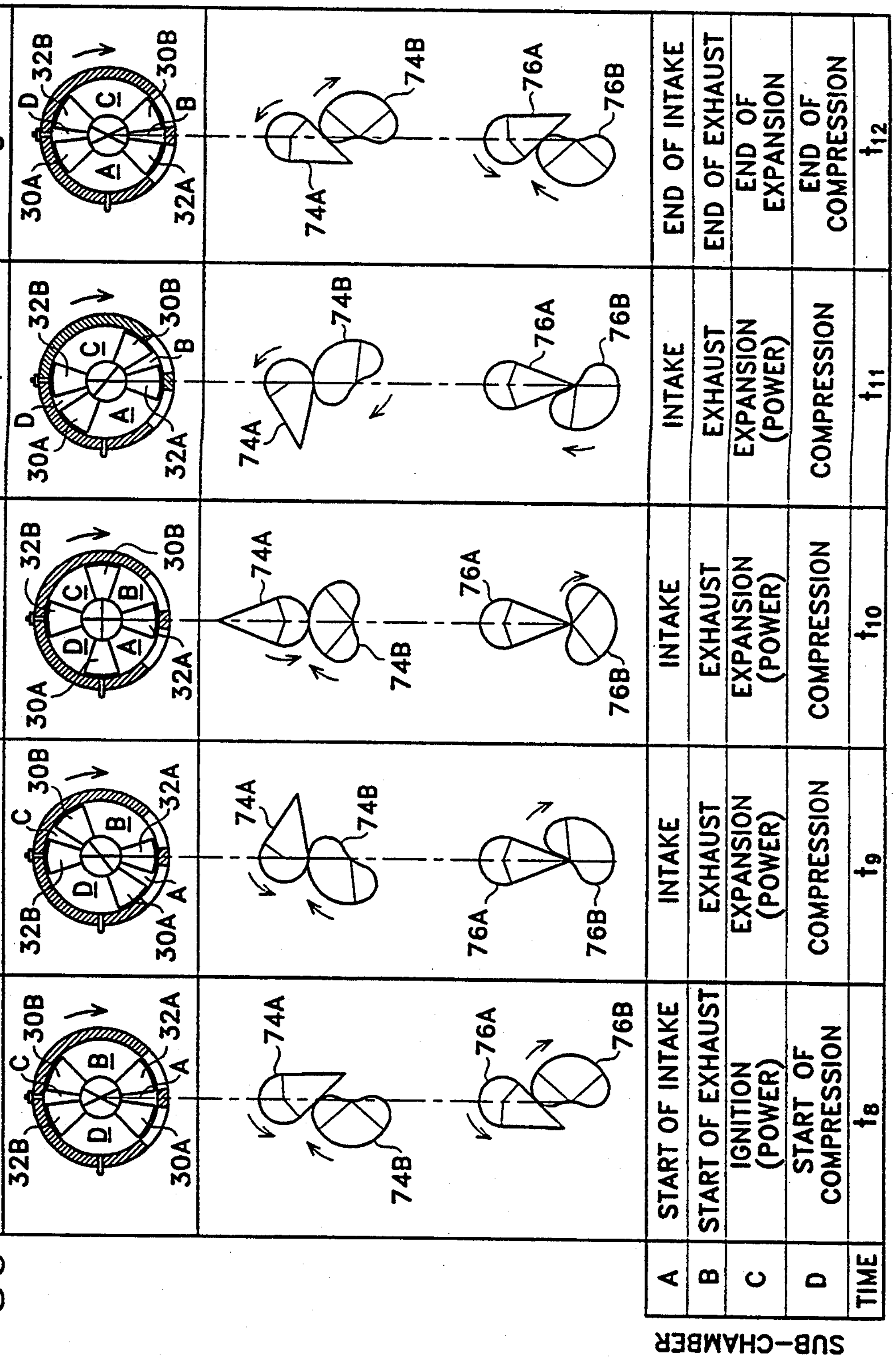
Figure 8D:
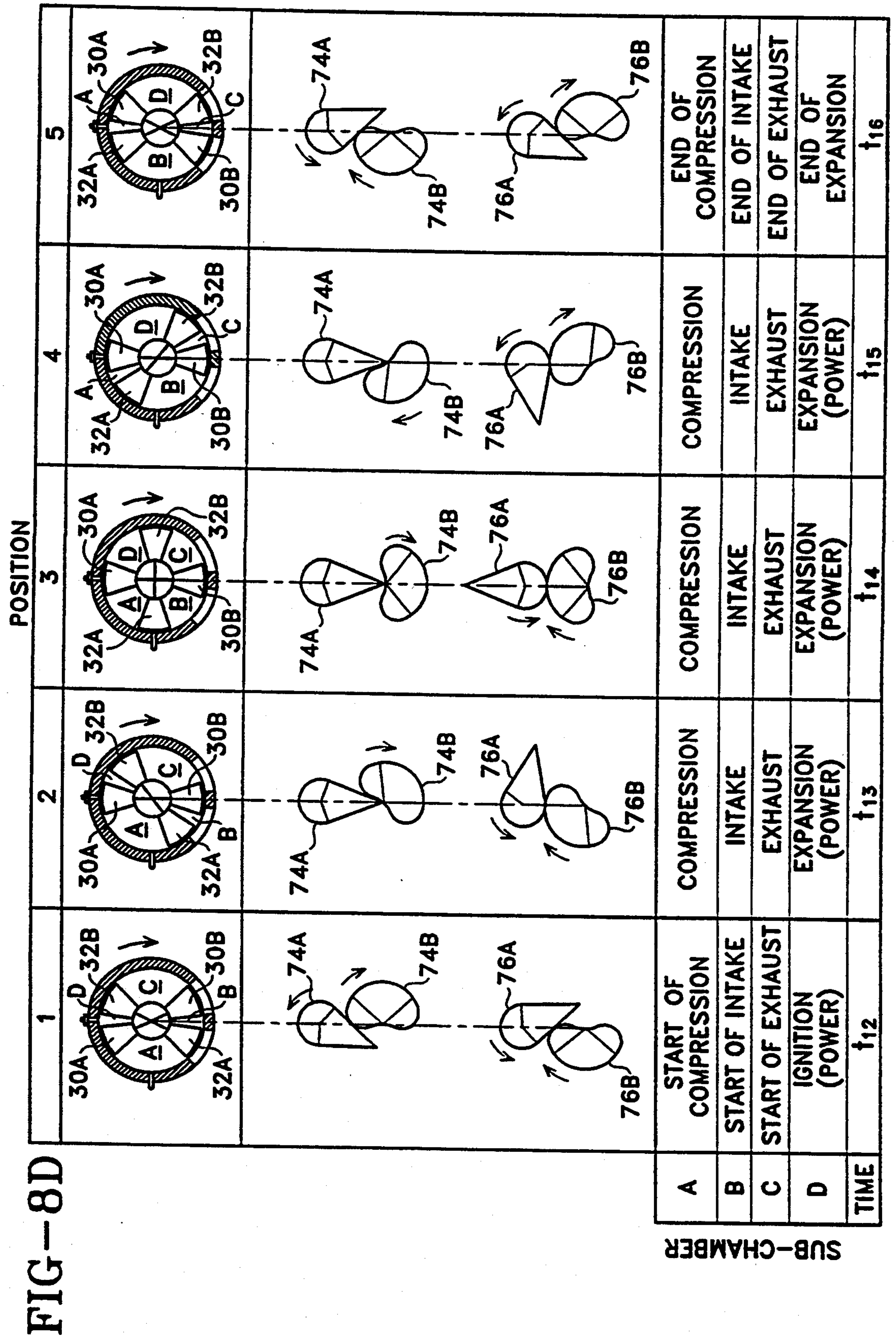
Figure 9:
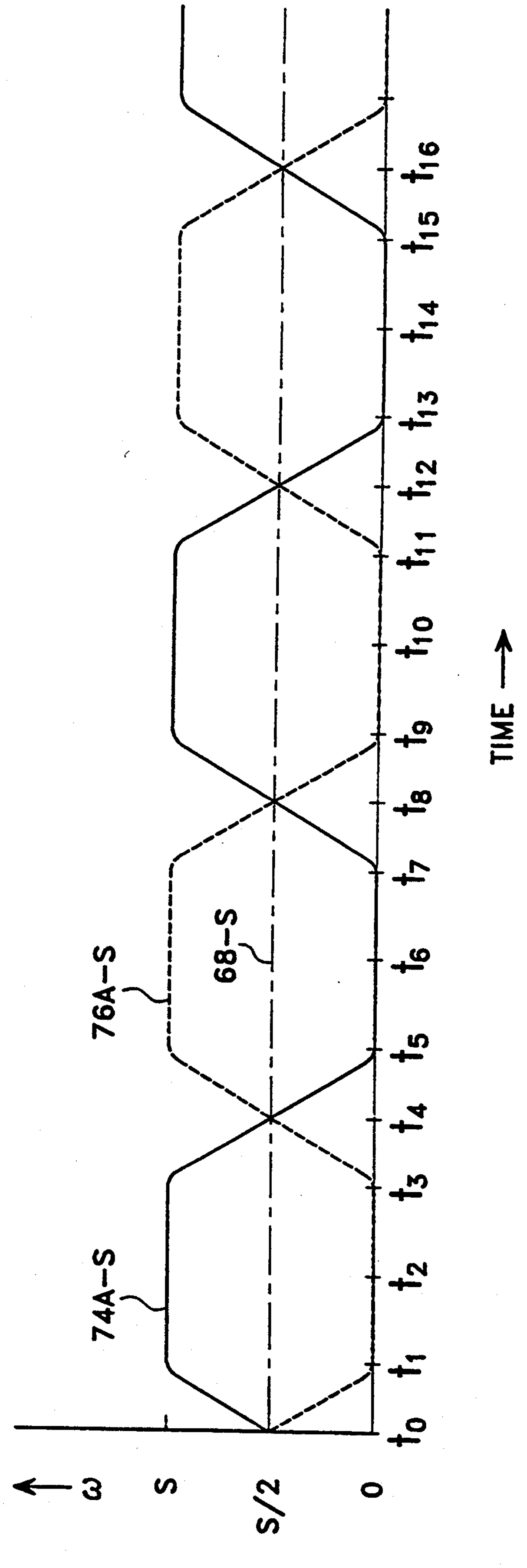
FIG. 9 is a diagram showing rotational rate versus time of the differential inputs and output included in the interconnection of the piston assemblies.

In FIG. 8B, to which reference now is made, position 1 corresponds to position 5 of FIG. 8A at time $t_4$. Operation continues in a similar manner to that described above with reference to FIG. 8A except now sub-chamber B comprises the expansion sub-chamber, and sub-chambers C, D and A comprise the compression, intake and exhaust subchambers, respectively. Between times $t_4$ and $t_5$ the velocity ratio of gear set 76 increases to 2 while that of gear set 74 decreases to 0. As seen in FIG. 9, between times $t_4$ and $t_5$ the rotational rate 76A-S of tear-drop shaped gear 76A increases from S/2 to S while the rotational rate 74A-S of tear-drop shaped gear 74A decreases from S/2 to zero. Then, between times $t_5$ and $t_7$, tear-drop shaped gear 74A, and associated piston assembly 30, are prevented from rotating by engagement of the cusp of tear-drop shaped gear 74A with the recess formed in associated heart shaped gear 74B. As a result, trailing piston 30B of expansion sub-chamber B and trailing piston 30A of intake sub-chamber are stationary during the time period between $t_5$ and $t_7$. Position 5 of FIG. 8B corresponds to position 1 of FIG. 8C at time $t_8$, and position 5 of FIG. 8C corresponds to position 1 of FIG. 8D at time $t_{12}$. Between times $t_0$ and $t_{16}$, the piston assemblies 30 and 32 complete one revolution during which time four engine operating cycles are completed.

Where a circular gear set 80 is employed for connecting the differential output 86 to the engine output 68, the combined velocity ratio of gear sets 74 and 76 must equal 2 in order to satisfy the requirements of Equation (1), above, which defines the operation of differential 78. From an examination of the drawings and Equation (1), it will be seen that z is the rotational rate both of differential output shaft 86 and of heart shaped gears 74B and 76B through gear set 80, x is the rotational rate both of sun gear 78A and of tear-drop shaped gear 74A affixed thereto, and y is the rotational speed both of sun gear 78B and of tear-drop shaped gear 76A affixed thereto. Multiplying both sides of equation (1) by two results in:

$$x+y=2z \tag{2}$$

So long as the velocity ratio of gear sets 74 and 76 adds to 2, the differential and gear sets operate simultaneously without interference. It here will be noted that a gear set 80 of non-circular gears, such as ellipsoidal gears, may be used, in which case the shape of gear sets 74 and 76 would have to be modified accordingly so that conditions specified by Equation (1) are satisfied at all times.

Figure 10:
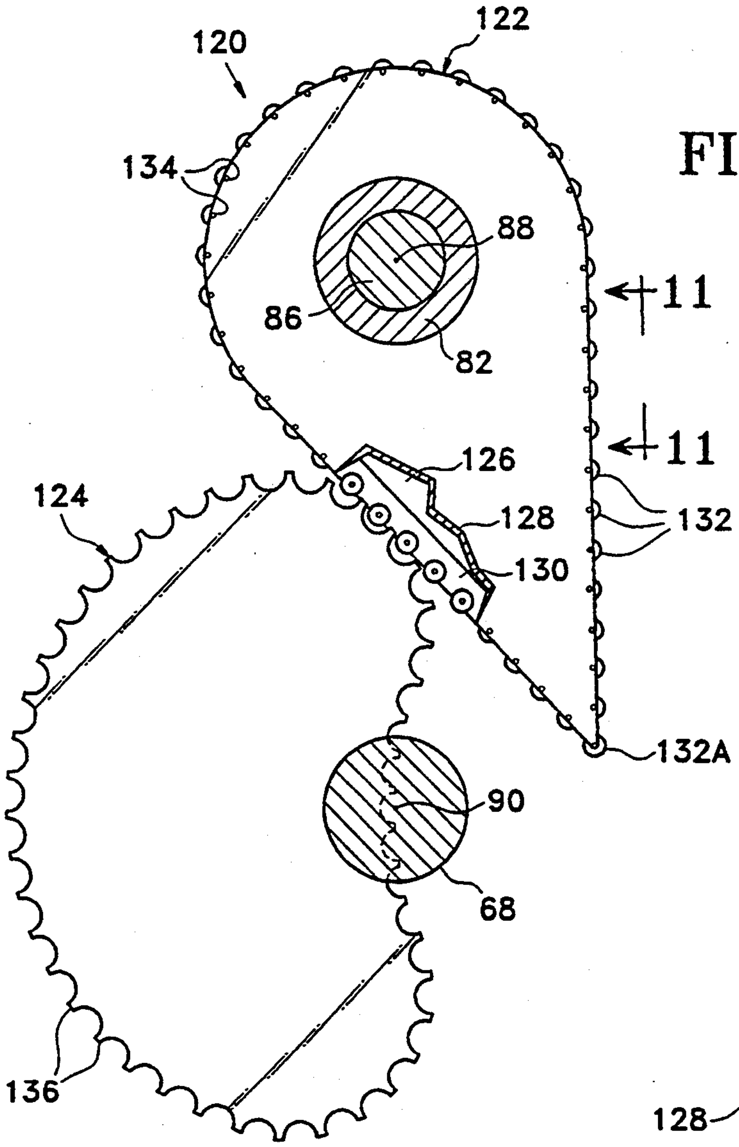
FIG. 10 is a view similar to FIG. 7 but showing a modified form of gear set that includes rollers and showing the cooperating gears at different rotary positions than in FIG. 7.
Figure 11:
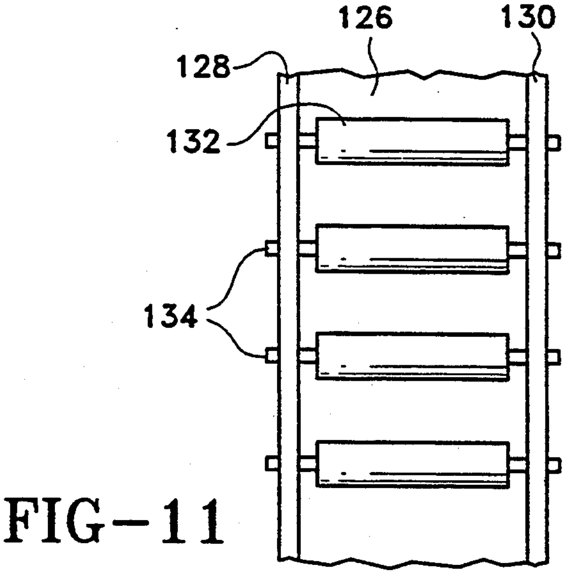
FIG. 11 is an enlarged fragmentary view taken along lines 11—11 of FIG. 10.

Reference now is made to FIGS. 10 and 11 wherein a gear set 120 comprising a modified form of tear-drop shaped gear 122 and cooperating heart shaped gear 124 is shown, which gear set may be employed in place of gear sets 74 and 76. Tear-drop shaped gear 122 is shown affixed to tubular shaft 82 which, in turn, is rotatably supported on shaft 86 rotatable about shaft axis 88, in the manner of gear set 74 shown in FIG. 7. Similarly, heart shaped gear 124 is shown attached to shaft 68 rotatable about axis 90. In this embodiment, tear-drop shaped gear 122 comprises a body 126 sandwiched between a pair of end plates 128 and 130 that extend outwardly from the periphery of the body. Gear teeth in the form of rollers 132 are located about the periphery of the gear, which rollers are rotatably supported on axles 134 extending between the end plates 128 and 130. The rollers are adapted for engagement with teeth 136 formed about the periphery of the heart shaped gear. As with gear sets 74 and 76 described above, tear-drop shaped gear 122 is prevented from rotating when tooth 132A at the cusp thereof engages the heart shaped gear at the recess formed therein adjacent axis 90. With this arrangement, frictional engagement between interengaging teeth is reduced for reduced wear. It will be apparent that gear sets that include a combination of conventional gear teeth and roller-type teeth may be employed. For example, the circular arc sections of gears 122 and 124 may be provided with conventional gear teeth in place of the illustrated roller-type teeth 132 on gear 122 and associated teeth 136 on gear 124.

The invention having been described in detail in accordance with requirement of the U.S. Patent Statutes, various other changes and modification will suggest themselves to those skilled in this art. For example, the novel combination of differential 78, non-circular gear sets 74 and 76, and gear set 80 for connecting the piston assemblies 30 and 32 to output shaft 68 may be used in conjunction with other systems including different type engines. For example, it may be included in the connection of pistons of a reciprocating-piston engine to an engine output shaft without the use of the conventional crank mechanism. Also, it will be apparent that the circular arc sections 100 and 102 of gears 74A and 74B are not limited to the illustrated 200° and 100°, respectively. In some applications for the tear-drop and heart shaped gears, it may be desired to either increase or decrease the circular arc sections, including a decrease thereof to zero degrees. It is intended that the above and other such changes and modifications shall fall within the spirit and scope of the invention defined in the appended claims.

I claim:

1. A mechanism for interconnecting first, second and third shafts for intermittent rotation of said first and second shafts and continuous rotation of said third shaft, said mechanism comprising,
   - differential means having first and second inputs connected to said first and second shafts, respectively, and an output rotatably coupled to said third shaft,
   - first and second gear sets each of which gear sets comprises intermeshing generally tear-drop and heart shaped gears, said heart shaped gears and third shaft being attached to each other for simultaneous rotation about the axis of the third shaft, and
   - means for connecting the tear-drop shaped gears of said first and second gear sets to said first and second shafts, respectively.

2. A mechanism as defined in claim 1 wherein said tear-drop shaped gears each includes a cusp at one end and said heart shaped gears each include a pair of adjacent generally spiral sections forming an indentation therebetween, said tear-drop shaped gears being non-rotatable during engagement of the cusp of the tear-drop shaped gear with the indentation in the associated heart shaped gear.

3. A mechanism as defined in claim 2 wherein said tear-drop shaped and heart shaped gears include circular arc sections.

4. A mechanism as defined in claim 3 wherein said circular arc sections of said tear-drop and heart shaped gears have a velocity ratio of 2.

5. A gear set comprising generally tear-drop and heart shaped gears, said heart shaped gear comprising a heart shaped body formed with a recess and having outwardly extending teeth about the periphery of the body, said heart shaped gear having an axis of rotation at a spaced distance from the heart shaped body at said recess, said tear-drop shaped gear comprising a tear-drop shaped body with a cusp and outwardly extending teeth about the periphery of the body including a tooth at the cusp, the tear-drop shaped gear being prevented from rotation when the tooth at the cusp is engaged between adjacent teeth on the heart shaped gear during operation of the gear set.

* * * * *